(12) United States Patent
Wang et al.

(10) Patent No.: US 11,464,041 B2
(45) Date of Patent: *Oct. 4, 2022

(54) NETWORK NODE, USER DEVICE AND METHODS THEREOF

(71) Applicant: Huawei Technologies Co., Ltd., Shenzhen (CN)

(72) Inventors: Fan Wang, Berkshire (GB); Fredrik Berggren, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/927,511

(22) Filed: Jul. 13, 2020

(65) Prior Publication Data
US 2020/0413437 A1 Dec. 31, 2020

Related U.S. Application Data

(63) Continuation of application No. 16/102,059, filed on Aug. 13, 2018, now Pat. No. 10,736,135, which is a
(Continued)

(51) Int. Cl.
*H04W 72/14* (2009.01)
*H04W 72/04* (2009.01)
*H04L 5/00* (2006.01)

(52) U.S. Cl.
CPC ............ *H04W 72/14* (2013.01); *H04L 5/003* (2013.01); *H04W 72/0413* (2013.01);
(Continued)

(58) Field of Classification Search
CPC ... H04W 72/14; H04W 72/263; H04W 72/12; H04W 72/0413; H04W 72/0473;
(Continued)

(56) References Cited

U.S. PATENT DOCUMENTS

| 2009/0220017 A1 | 9/2009 | Kawamura et al. |
| 2010/0177721 A1 | 7/2010 | Simonsson et al. |

(Continued)

FOREIGN PATENT DOCUMENTS

| CN | 101978634 A | 2/2011 |
| CN | 104798425 A | 7/2015 |

(Continued)

OTHER PUBLICATIONS

"Uplink Resource Allocation Design for Enhanced LAA," 3GPP TSG-RAN WG1#84, St. Julian's, Malta, R1-160994, 3rd Generation Partnership Project, Valbonne, France (Feb. 15-19, 2016).

(Continued)

*Primary Examiner* — Phong La
(74) *Attorney, Agent, or Firm* — Leydig, Voit & Mayer, Ltd.

(57) ABSTRACT

The disclosure relates to a network node and a user device. The network node is configured to determine a resource indicator comprising a single resource allocation value that specifies a first start index and a first number of frequency resources. The first start index and the first number of frequency resources are used for allocating a first set of contiguous frequency resources within a first sub-band, and a corresponding first set of contiguous frequency resources within a second sub-band. The first sub-band and the second sub-band are non-overlapping and comprise equal number of frequency resources. The network node includes a transceiver configured to transmit a transmission grant comprising the resource indicator to the user device.

23 Claims, 7 Drawing Sheets

Related U.S. Application Data continuation of application No. PCT/EP2016/055998, filed on Mar. 18, 2016.

(52) U.S. Cl.
CPC ... *H04W 72/0453* (2013.01); *H04W 72/0473* (2013.01); *H04W 72/042* (2013.01); *H04W 72/048* (2013.01)

(58) Field of Classification Search
CPC ............. H04W 72/042; H04W 72/048; H04W 72/04461; H04W 72/0406; H04L 5/003; H04L 5/0032; H04L 5/0033; H04L 5/0039; H04L 5/0001
See application file for complete search history.

(56) References Cited

U.S. PATENT DOCUMENTS

| | | |
|---|---|---|
| 2011/0022438 A1 | 1/2011 | Lian |
| 2012/0201211 A1 | 8/2012 | Wong |
| 2012/0243496 A1 | 9/2012 | Zhu et al. |
| 2012/0263132 A1 | 10/2012 | Guan et al. |
| 2013/0070724 A1 | 3/2013 | Malladi |
| 2013/0336242 A1 | 12/2013 | Rajagopal et al. |
| 2014/0029537 A1 | 1/2014 | Golitschek Edler Von Elbwart et al. |
| 2014/0307667 A1 | 10/2014 | Wager et al. |
| 2014/0341126 A1 | 11/2014 | Piipponen et al. |
| 2015/0181608 A1 | 6/2015 | Frederiksen et al. |
| 2016/0095137 A1* | 3/2016 | Chen .................. H04L 25/0224 370/329 |
| 2016/0323749 A1* | 11/2016 | Yang .................... H04W 24/02 |
| 2017/0055294 A1 | 2/2017 | Lee et al. |
| 2017/0290016 A1 | 10/2017 | Yi et al. |
| 2017/0347268 A1* | 11/2017 | Chen .................... H04B 1/7143 |
| 2017/0347354 A1 | 11/2017 | Yang et al. |
| 2018/0076924 A1* | 3/2018 | Lee ....................... H04L 1/0026 |
| 2018/0132257 A1 | 5/2018 | Golitschek Edler Von Elbwart et al. |
| 2018/0241499 A1 | 8/2018 | Einhaus et al. |

FOREIGN PATENT DOCUMENTS

| | | |
|---|---|---|
| CN | 105187171 A | 12/2015 |
| KR | 20120109564 A | 10/2012 |
| KR | 20140027115 A | 3/2014 |

OTHER PUBLICATIONS

"PUSCH design details for LAA," 3GPP TSG RAN WG1 #84, St. Julian's, Malta, R1-160884, 3rd Generation Partnership Project, Valbonne, France (Feb. 15-19, 2016).

"UL waveform for LAA PUSCH," 3GPP TSG-RAN WG1 Meeting #84, St. Julian's, Malta, R1-160775, 3rd Generation Partnership Project, Valbonne, France (Feb. 15-19, 2016).

"3rd Generation Partnership Project; Technical Specification Group Radio Access Network; Evolved Universal Terrestrial Radio Access (E-UTRA); Multiplexing and channel coding(Release 13)," 3GPP TS 36.212 V13.0.0, pp. 1-121, 3rd Generation Partnership Project, Valbonne, France (Dec. 2015).

"3rd Generation Partnership Project; Technical Specification Group Radio Access Network; Evolved Universal Terrestrial Radio Access (E-UTRA); Physical layer procedures(Release 13)," 3GPP TS 36.213 V13.0.1 pp. 1-326, 3rd Generation Partnership Project, Valbonne, France (Jan. 2016).

"Discussion on PUSCH design for eLAA UL," 3GPP TSG RAN WG1 Meeting #84, St. Julian's, Malta, R1-160946, pp. 1-5, 3rd Generation Partnership Project-Valbonne, France (Feb. 15-19, 2016).

"Resource configuration and search space design for E-PDCCH," 3GPP TSG RAN WG1 Meeting #71, New Orleans, USA, R1-124763, pp. 1-5, 3rd Generation Partnership Project—Valbonne, France (Nov. 12-16, 2012).

"Discussion on PHR report," 3GPP TSG-RAN WG2 Meeting #71bis, Xi'an, China, R2-105345, pp. 1-4, 3rd Generation Partnership Project—Valbonne, France (Oct. 11-15, 2010).

\* cited by examiner

NETWORK NODE, USER DEVICE AND METHODS THEREOF

CROSS-REFERENCE TO RELATED APPLICATIONS

This application is a continuation of U.S. patent application Ser. No. 16/102,059, filed on Aug. 13, 2018, which is a continuation of International Application No. PCT/EP2016/055998, filed on Mar. 18, 2016. All of the afore-mentioned patent applications are hereby incorporated by reference in their entireties.

TECHNICAL FIELD

The disclosure relates to a network node and a user device for a wireless communication system. Furthermore, the disclosure also relates to corresponding methods, a wireless communication system, a computer program, and a computer program product.

BACKGROUND

In Long Term Evolution (LTE) uplink, a Single Carrier-Frequency Division Multiple Access (SC-FDMA) waveform is used and the time-frequency resources for the Physical Uplink Shared Channel (PUSCH) can be allocated by a single or dual cluster of frequency resources, where each cluster (i.e., set of frequency resources) is localized in frequency within a slot and consists of a number of frequency-consecutive Physical Resource Blocks (PRBs). A single Discrete Fourier Transform (DFT)-precoder is applied for the one or two clusters. Hence, a single cluster achieves the lowest Cubic Metric (CM) and Peak-to-Average-Power Ratio (PAPR) performance, while a dual cluster allocation provides slightly more freedom for the scheduler, albeit at potentially larger CM/PAPR. Dynamic PUSCH resource allocation is conveyed by a resource allocation field in the associated uplink grant sent in the downlink control channel, where PUSCH resource allocation type 0 is used for single cluster PUSCH, and PUSCH resource allocation type 1 is for dual cluster PUSCH.

LTE Rel-13 can also be deployed for downlink transmissions in unlicensed spectrum, i.e., utilizing Licensed Assisted Access (LAA) where an unlicensed carrier is operated as a Secondary Cell (SCell) in conjunction with a Primary Cell (PCell) located in licensed spectrum. It is desirable to extend the functionality of LAA by including uplink (UL) transmissions. In particular, LTE relies on E-UTRAN NodeB or evolved NodeB (eNodeBs) to perform uplink scheduling, which allows multiple User Equipments (UEs) in a cell to transmit PUSCH on orthogonal resources within a subframe. That is, LTE is not constrained to wideband scheduling for one user at a time, as is the case for many WiFi systems, and could leverage the frequency selectivity of the channels for the UEs into scheduling gains. The scheduler could also schedule UEs on the same time-frequency resource within a cell and utilize spatial suppression to separate the UEs at the receiver, i.e., Multi-User MIMO (MU-MIMO).

For LAA, a first regulatory requirement is that the occupied channel bandwidth shall be between 80% and 100% of the declared nominal channel bandwidth. The occupied channel bandwidth is the bandwidth containing 99% of the power of the signal. This requirement does not mandate that only a single UE can occupy 80-100% of the carrier bandwidth. For example, it would be possible to multiplex PUSCH from several UEs in an UL subframe over the whole carrier bandwidth using interleaved Frequency Division Multiplexing (FDM) allocation, while fulfilling the occupied channel bandwidth requirement. In addition, a second regulatory requirement is the transmission power in a narrow band. For example, in the frequency band 5250-5350 MHz, the power spectral density for transmissions shall be limited to a maximum mean Equivalent Isotropically Radiated Power (EIRP) density of 10 mW/MHz in any 1 MHz band. This implies that, in order not to limit the transmit power, it is beneficial to allocate the resources in as many '1 MHz' bands as possible.

In principle, using a large single cluster in PUSCH resource allocation could guarantee that the channel bandwidth occupancy requirement is met for a UE as well as the maximum mean EIRP is not exceeded. However, this would result in an inefficient system operation since it may imply either that only one UE could be scheduled at a time or that the code rate will be very low since a large amount of contiguous resources has to be allocated. In order to efficiently support UE multiplexing of PUSCH, extending the current single and dual cluster allocation to allow multi-cluster (>2) allocation (e.g., PRBs/subcarriers spaced uniformly in frequency) has been identified as a candidate waveform that satisfies regulatory requirements. Furthermore, an efficient resource allocation scheme should allow UEs to be allocated with different amount of resources, e.g., different number of PRBs. At the same time, it is important that the resource allocation information can be signalled to the UE with few bits, in order to reduce the overhead on the downlink control channel. It is therefore an open issue to define multi-cluster allocation for PUSCH transmission for LAA and the corresponding encoding of the allocation information.

In LTE, the starting resource index, i.e., PRB index, and the number of allocated resources, i.e., number of PRBs, are represented by a single integer value which is signalled to the UE. PUSCH resource allocation type 0, i.e., single cluster PUSCH, comprises encoding through the resource index, a starting PRB index and the number of allocated PRBs. PUSCH resource allocation type 1, i.e., dual cluster PUSCH, comprises encoding through the resource index, four RBG indices, where the first two RBG indices are used for the starting RBG index and the ending RBG index of one cluster, and the last two RBG indices are used for the other cluster in the same way. These methods cannot support a multi cluster PUSCH, as the current PUSCH resource allocation only supports up to two clusters. Furthermore, the number of allocated resource blocks, N_PRB, is constrained by $N\_PRB = 2^{\alpha_2} \cdot 3^{\alpha_3} \cdot 5^{\alpha_5} \leq N_{RB}^{UL}$, where $\alpha_2$, $\alpha_3$, $\alpha_5$ are non-negative integers and $N_{RB}^{UL}$ is the number of available PRBs.

In one conventional solution, the multi cluster PUSCH is indicated using 10 clusters with 1 PRB per cluster and an inter-cluster spacing of 1.8 MHz (10 PRBs), i.e., every $10^{th}$ PRB is allocated. Thus there are 10 different PRB allocations, each comprising 10 PRBs. The UE may be allocated from 1 to 10 of these PRB allocations, yielding from 10 to 100 PRBs in total. The exact assignment of which resource allocation to be used is left to eNB, e.g., by signalling via a 10-bit bitmap in the UL grant. The signalling overhead is thus 10 bits to indicate the multi-cluster PUSCH.

SUMMARY

An objective of embodiments of the disclosure is to provide a solution which mitigates or solves the drawbacks and problems of conventional solutions.

The above and further objectives are achieved by the subject matter of the independent claims. Further advantageous implementation forms of the disclosure are defined by the dependent claims.

According to a first aspect of the disclosure, the above mentioned and other objectives are achieved with a network node for a wireless communication system, the network node comprising
a processor configured to
determine a resource indicator comprising a first start index and a first number of frequency resources, wherein the first start index and the first number of frequency resources are used for allocating
a first set of contiguous frequency resources within a first sub-band, and
a corresponding first set of contiguous frequency resources within a second sub-band,
wherein the first sub-band and the second sub-band are non-overlapping and comprise equal number of frequency resources;
a transceiver configured to
transmit a transmission grant comprising the resource indicator to a user device.

A first start index could refer to the index of a PRB or any other radio resource unit of the wireless communication system.

A set of contiguous frequency resources could refer to a set of contiguous PRBs or any other radio resource unit of the wireless communication system.

A corresponding first set could refer to that the resulting resource allocation is the same within the first sub-band and within the second sub-band. It should be noted that the sets may contain different resource indices (e.g., different PRB indices if the PRBs are enumerated over both sub-bands) but the resulting resource allocation becomes the same in both sub-bands.

A network node according to the first aspect provides a number of advantages over conventional network nodes. The number of bits for indicating the resource allocation can be reduced compared to conventional solutions, which renders less overhead in the (downlink) control channel and better detection performance of the (downlink) control channel containing the resource allocation information.

In a first possible implementation form of a network node according to the first aspect, the transceiver is configured to
receive user device information comprising at least one of reference signals associated with the user device, total number of bits in a transmission buffer of the user device, and available transmission power at the user device,
wherein the processor is configured to
determine the resource indicator based on the received user device information.

This implementation form is advantageous as it allows determining the resource indicator by selecting the allocation to match any of the channel quality, the required payload, and the available transmit power, or combinations thereof. Therefore, the network node can select the most efficient resource allocation given the practical constraints for transmission.

In a second possible implementation form of a network node according to the first implementation form of the first aspect or to the first aspect as such, if the total number of allocated frequency resources of all sub-bands belongs to a predetermined set of values, the wireless communication system comprises
a plurality of non-overlapping sub-bands having the same frequency resource allocation, or
at least one third sub-band having a frequency resource allocation different to the frequency resource allocation in the first sub-band or the second sub-band.

This implementation form is advantageous as it can assure that constraints on the total number of allocated resources are always met.

In a third possible implementation form of a network node according to the first or second implementation forms of the first aspect or to the first aspect as such, the resource indicator further comprises a second start index and a second number of frequency resources used for allocating
a second set of contiguous frequency resources within the first sub-band, and
a corresponding second set of contiguous frequency resources within the second sub-band.

This implementation form is advantageous as it allows flexibility within each sub-band by that a dual-set resource allocation is allowed, thereby supporting more flexible resource allocation and user device multiplexing. It shall be noted the resource allocation is the same in each sub-band.

In a fourth possible implementation form of a network node according to the third implementation form of the first aspect, the first set of contiguous frequency resources is allocated within a first sub-region of the first sub-band and within a corresponding first sub-region of the second sub-band, and the second set of contiguous frequency resources is allocated within a second sub-region of the first sub-band and within a corresponding second sub-region of the second sub-band,
wherein the first sub-region and the second sub-region are non-overlapping and comprise equal number of frequency resources.

This implementation form is advantageous since the two sets allow allocations occupying several 1 MHz parts within a sub-band, which is beneficial for allowing maximum transmit power considering the regulatory maximum power spectral density requirement given per 1 MHz.

In a fifth possible implementation form of a network node according to the fourth implementation form of the first aspect, the processor is configured to
determine the resource indicator as a first allocation value and a second allocation value;
wherein the first allocation value either indicates the first start index and the first number of frequency resources or an empty set of frequency resources within the first sub-region and the corresponding first sub-region,
wherein the second allocation value either indicates the second start index and the second number of frequency resources or an empty set of frequency resources within the second sub-region and the corresponding second sub-region.

This implementation form is advantageous since it allows flexibility in allocating either one or two clusters within a sub-band in a dynamic fashion.

In a sixth possible implementation form of a network node according to the first implementation form of the first aspect or to the first aspect as such, the processor is configured to
determine the resource indicator as a single allocation value.

This implementation form is advantageous since the overhead is reduced by using a single allocation value.

In a seventh possible implementation form of a network node according to any of the preceding implementation forms of the first aspect or to the first aspect as such, the resource indicator comprises a first end index associated with the first start index. The resource indicator may further in another implementation form comprise a second end index associated with the second start index.

This implementation form is advantageous since the number of frequency resources can be derived directly from the first start index and the associated first end index.

According to a second aspect of the disclosure, the above mentioned and other objectives are achieved with a user device for a wireless communication system, the user device comprising a transceiver configured to receive a transmission grant comprising a resource indicator from a network node, the resource indicator comprising a first start index and a first number of frequency resources, wherein the first start index and a first number of frequency resources are used for allocating a first set of contiguous frequency resources within a first sub-band, and a corresponding first set of contiguous frequency resources within a second sub-band, wherein the first sub-band and the second sub-band are non-overlapping and comprise equal number of frequency resources;

a processor configured to derive the first start index and the first number of frequency resources based on the resource indicator;

wherein the transceiver is configured to transmit data symbols to the network node using the first set of contiguous frequency resources and the corresponding first set of contiguous frequency resources.

A user device according to the second aspect provides a number of advantages over conventional user devices. The number of bits in the (downlink) control channel containing the information about the resource allocation could be smaller than in conventional methods. This makes the reception of the transmission grant more reliable, due to a lower code rate, and reduces the risk that the user device miss-detects the assignment. A miss-detection could imply that the user device does not transmit data at all or that it transmits data on resources which it has not been allocated, which is detrimental to system performance.

In a first possible implementation form of a user device according to the second aspect, the resource indicator further comprises a second start index and a second number of frequency resources used for allocating a second set of contiguous frequency resources within the first sub-band and a corresponding second set of contiguous frequency resources within the second sub-band, wherein the processor is configured to derive the second start index and the second number of frequency resources based on the resource indicator, wherein the transceiver is configured to transmit data symbols to the network node using the second set of contiguous frequency resources and the corresponding second set of contiguous frequency resources.

This implementation form is advantageous since the two sets allow allocations occupying several 1 MHz parts within a sub-band, which is beneficial for allowing the user device to use maximum transmit power considering the regulatory maximum power spectral density requirement given per 1 MHz.

In a second possible implementation form of a user device according to the first implementation form of the second aspect, the first set of contiguous frequency resources is allocated within a first sub-region of the first sub-band and within a corresponding first sub-region of the second sub-band, and the second set of contiguous frequency resources is allocated within a second sub-region of the first sub-band and within a corresponding second sub-region of the second sub-band, wherein the first sub-region and the second sub-region are non-overlapping and comprise equal number of frequency resources.

This implementation form is advantageous as it allows flexibility in transmitting one or two sets within a sub-band.

In a third possible implementation form of a user device according to the second implementation form of the second aspect, the resource indicator is represented as a first allocation value and a second allocation value;

wherein the first allocation value indicates the first start index and the first number of frequency resources or an empty set of frequency resources within the first sub-region and the corresponding first sub-region, wherein the second allocation value indicates the second start index and the second number of frequency resources or an empty set of frequency resources within the second sub-region and the corresponding second sub-region.

wherein the processor is configured to derive the first start index and the first number of frequency resources based on the first allocation value, derive the second start index and the second number of frequency resources based on the second allocation value, wherein the transceiver is configured to transmit data symbols to the network node using the first set of contiguous frequency resources and the corresponding first set of contiguous frequency resources, transmit data symbols to the network node using the second set of contiguous frequency resources and the corresponding second set of contiguous frequency resources.

This implementation form is advantageous since the two sets allow allocations occupying several 1 MHz parts within a sub-band, which is beneficial for allowing maximum transmit power considering the regulatory maximum power spectral density requirement given per 1 MHz.

In a fourth possible implementation form of a user device according to the first implementation form of the second aspect or to the second aspect as such, the resource indicator is represented as a single allocation value, wherein the processor is configured to derive at least one of the first start index and the first number of frequency resources and the second start index and the second number of frequency resources based on the single allocation value.

This implementation form is advantageous since a single allocation value could be represented by few bits thereby reducing overhead in the system.

In a fifth possible implementation form of a user device according to any of the preceding implementation forms of the second aspect or to the second aspect as such, the transmission grant indicates a first end index associated with the first start index, wherein the processor is configured to derive the first number of frequency resources based on the first start index and the first end index.

The resource indicator may further in another implementation form comprise a second end index associated with the second start index.

This implementation form is advantageous since the number of frequency resources can be derived directly from the first start index and the associated first end index.

According to a third aspect of the disclosure, the above mentioned and other objectives are achieved with a method comprising:

determining a resource indicator comprising a first start index and a first number of frequency resources, wherein the first start index and the first number of frequency resources are used for allocating a first set of contiguous frequency resources within a first sub-band, and a corresponding first set of contiguous frequency resources within a second sub-band, wherein the first sub-band and the second sub-band are non-overlapping and comprise equal number of frequency resources.

transmitting a transmission grant comprising the resource indicator to a user device.

In a first possible implementation form of a method according to the third aspect, the method comprises receiving user device information comprising at least one of reference signals associated with the user device, total number of bits in a transmission buffer of the user device, and available transmission power at the user device, wherein the processor is configured to determining the resource indicator based on the received user device information.

In a second possible implementation form of a method according to the first implementation form of the third aspect or to the third aspect as such, if the total number of allocated frequency resources of all sub-bands belongs to a predetermined set of values, the wireless communication system comprises a plurality of non-overlapping sub-bands having the same frequency resource allocation, or at least one third sub-band having a frequency resource allocation different to the frequency resource allocation in the first sub-band or the second sub-band.

In a third possible implementation form of a method according to the first or second implementation forms of the third aspect or to the third aspect as such, the resource indicator further comprises a second start index and a second number of frequency resources used for allocating a second set of contiguous frequency resources within the first sub-band, and a corresponding second set of contiguous frequency resources within the second sub-band.

In a fourth possible implementation form of a method according to the third implementation form of the third aspect, the first set of contiguous frequency resources is allocated within a first sub-region of the first sub-band and within a corresponding first sub-region of the second sub-band, and the second set of contiguous frequency resources is allocated within a second sub-region of the first sub-band and within a corresponding second sub-region of the second sub-band, wherein the first sub-region and the second sub-region are non-overlapping and comprise equal number of frequency resources.

In a fifth possible implementation form of a method according to the fourth implementation form of the third aspect, the method comprises determining the resource indicator as a first allocation value and a second allocation value;

wherein the first allocation value either indicates the first start index and the first number of frequency resources or an empty set of frequency resources within the first sub-region and the corresponding first sub-region, wherein the second allocation value either indicates the second start index and the second number of frequency resources or an empty set of frequency resources within the second sub-region and the corresponding second sub-region.

In a sixth possible implementation form of a method according to the first implementation form of the third aspect or to the third aspect as such, the method comprises determining the resource indicator as a single allocation value.

In a seventh possible implementation form of a method according to any of the preceding implementation forms of the third aspect or to the third aspect as such, the resource indicator comprises a first end index associated with the first start index.

According to a fourth aspect of the disclosure, the above mentioned and other objectives are achieved with a method comprising:

receiving a transmission grant comprising a resource indicator from a network node, the resource indicator comprising a first start index and a first number of frequency resources, wherein the first start index and a first number of frequency resources are used for allocating a first set of contiguous frequency resources within a first sub-band, and a corresponding first set of contiguous frequency resources within a second sub-band, wherein the first sub-band and the second sub-band are non-overlapping and comprise equal number of frequency resources;

deriving the first start index and the first number of frequency resources based on the resource indicator;

transmitting data symbols to the network node using the first set of contiguous frequency resources and the corresponding first set of contiguous frequency resources.

In a first possible implementation form of a method according to the second aspect, the resource indicator further comprises a second start index and a second number of frequency resources used for allocating a second set of contiguous frequency resources within the first sub-band and a corresponding second set of contiguous frequency resources within the second sub-band, wherein the processor is configured to derive the second start index and the second number of frequency resources based on the resource indicator, wherein the transceiver is configured to transmit data symbols to the network node using the second set of contiguous frequency resources and the corresponding second set of contiguous frequency resources.

In a second possible implementation form of a method according to the first implementation form of the fourth aspect, the first set of contiguous frequency resources is allocated within a first sub-region of the first sub-band and within a corresponding first sub-region of the second sub-band, and the second set of contiguous frequency resources is allocated within a second sub-region of the first sub-band and within a corresponding second sub-region of the second sub-band, wherein the first sub-region and the second sub-region are non-overlapping and comprise equal number of frequency resources.

In a third possible implementation form of a method according to the second implementation form of the fourth aspect, the resource indicator is represented as a first allocation value and a second allocation value;

wherein the first allocation value indicates the first start index and the first number of frequency resources or an empty set of frequency resources within the first sub-region and the corresponding first sub-region, wherein the second allocation value indicates the second start index and the second number of frequency resources or an empty set of frequency resources within the second sub-region and the corresponding second sub-region, the method comprises deriving the first start index and the first number of frequency resources based on the first allocation value, deriving the second start index and the second number of frequency resources based on the second allocation value, transmitting data symbols to the network node using the first set of contiguous frequency resources and the corresponding first set of contiguous frequency resources, transmitting data symbols to the network node using the second set of contiguous frequency resources and the corresponding second set of contiguous frequency resources.

In a fourth possible implementation form of a method according to the first implementation form of the fourth aspect or to the fourth aspect as such, the resource indicator is represented as a single allocation value, the method comprising deriving at least one of the first start index and the first number of frequency resources and the second start index and the second number of frequency resources based on the single allocation value.

In a fifth possible implementation form of a method according to any of the preceding implementation forms of the fourth aspect or to the fourth aspect as such, the transmission grant indicates a first end index associated with the first start index, the method comprising deriving the first number of frequency resources (N1) based on the first start index (I1) and the first end index.

The advantages of the methods according to the third and fourth aspects are the same as the corresponding network node and user device according to the first and second aspects.

Embodiments of the disclosure also relates to a computer program, characterized in code means, which when run by processing means causes said processing means to execute any method according to the disclosure. Further, the disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of embodiments of the disclosure will be apparent from the following detailed description.

BRIEF DESCRIPTION OF THE DRAWINGS

The appended drawings are intended to clarify and explain different embodiments of the disclosure, in which.

DETAILED DESCRIPTION

Figure 1:
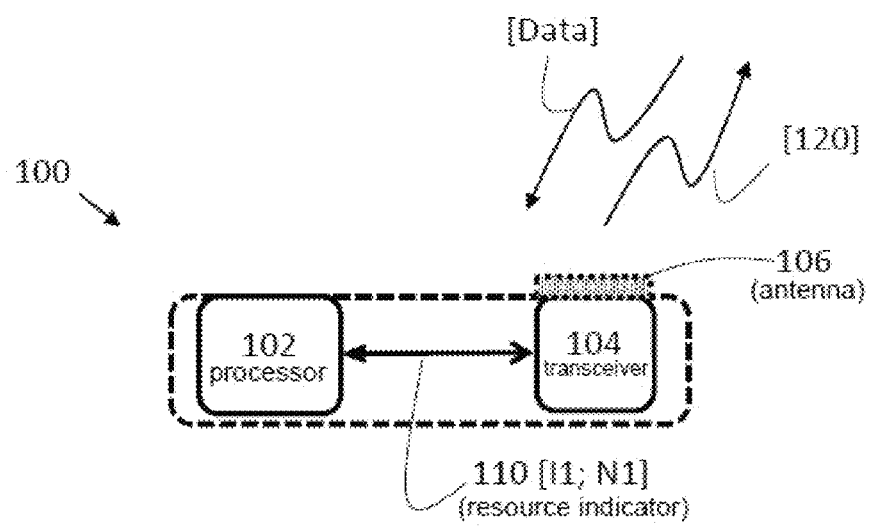
FIG. 1 shows a network node according to an embodiment of the disclosure.

FIG. 1 shows a network node 100 according to an embodiment of the disclosure. The network node 100 comprises a processor 102 communicably coupled to a transceiver 104. Further, an optional antenna 106 is shown in FIG. 1. The antenna 106 is coupled to the transceiver 104 and is configured to transmit and/or receive wireless communication signals in a wireless communication system 500.

The processor 102 of the network node 100 is configured to determine a resource indicator 110 comprising a first start index I1 and a first number of frequency resources N1. The first start index I1 and the first number of frequency resources N1 are used for allocating a first set of contiguous frequency resources R1 within a first sub-band, and further used for allocating a corresponding first set of contiguous frequency resources R1' within a second sub-band. The first sub-band and the second sub-band are non-overlapping and comprise equal number of frequency resources. The transceiver 104 is configured to transmit a transmission grant 120 comprising the resource indicator 110 to a user device 300 (not shown in FIG. 1, see FIG. 3). It is noted that the first set of frequency resources can allocated in further sub-bands.

In this disclosure a network node 100 may refer to a network control node or a network access node or an access point or a base station, e.g., a Radio Base Station (RBS), which in some networks may be referred to as transmitter, "eNB", "eNodeB", "NodeB" or "B node", depending on the technology and terminology used. The network nodes may be of different classes such as, e.g., macro eNodeB, home eNodeB or pico base station, based on transmission power and thereby also cell size. The network node can be an 802.11 access point or a Station (STA), which is any device that contains an IEEE 802.11-conformant Media Access Control (MAC) and Physical Layer (PHY) interface to the Wireless Medium (WM). The network node 100 is however not limited to the above mentioned communication devices.

Figure 2:
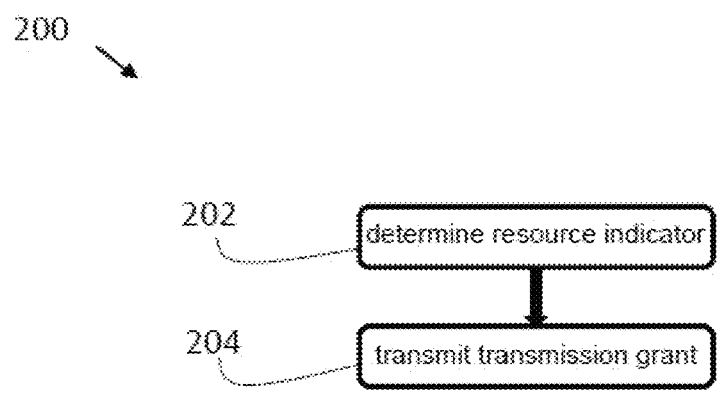
FIG. 2 shows a corresponding method according to an embodiment of the disclosure.

FIG. 2 shows a corresponding method which may be executed in a network node 100, such as the one described in FIG. 1. The method 200 comprises determining 202 a resource indicator 110 comprising a first start index I1 and a first number of frequency resources N1. The first start index I1 and the first number of frequency resources N1 are used for allocating a first set of contiguous frequency resources R1 within a first sub-band, and further used for allocating a corresponding first set of contiguous frequency resources R1' within a second sub-band. The first sub-band and the second sub-band are non-overlapping and comprise equal number of frequency resources. The method 200 further comprises transmitting 204 a transmission grant 120 comprising the resource indicator 110 to a user device 300.

The first start index I1 indicates a position in the time-frequency plane of the resource. For example, resources could be denoted as PRBs (e.g., comprising Resource Elements (REs) located within 180 kHz and 0.5 ms) and PRBs could be indexed, e.g., in an ascending order in frequency.

In this disclosure the expressions "set" and "cluster" can be used interchangeably. A set or cluster of frequency resources refers to one or several frequency contiguous resources, e.g., one or several REs/PRBs, and clusters may or may not be consecutively located. The clusters are non-overlapping, i.e., they have no resources in common.

Corresponding first set of contiguous frequency resources R1' means that an allocation using this set implies that the resource allocation is the same within the second sub-band as within the first sub-band. For example, if R1 includes the x:th PRB in the first sub-band, R1' includes the x:th PRB in the second sub-band, and so on.

In one embodiment of the disclosure the transceiver 104 is configured to receive user device information 130 (see FIG. 11) associated with the user device 300. The user device information comprises at least one of:
reference signals associated with the user device 300;
total number of bits in a transmission buffer of the user device 300 which is also known as standard buffer status report; and
available transmission power at the user device 300 also known as power headroom.

The reference signals sent from the user device 300, allows the network node 100 to estimate the channel quality which is useful for determining the amount of resources and the best location of the resources to be assigned. The network node 100 may also utilize information about the amount of data which the user device 300 can transmit. This is useful for determining the amount of resources for the resource allocation to match the actual demand. The network node 100 may further utilize information about the available transmit power in the user device 300. This is useful for determining the amount of resources for the resource allocation such that it can be accommodated within the available transmit power.

The processor 102 is configured to determine the resource indicator 110 based on the received user device information. The user device information may be received directly from the user device 300. However, all or parts of the user device information may be received via one or more intermediate network nodes.

In another embodiment of the disclosure the transceiver 104 is configured to receive data from the user device 300 in response to the transmission of the transmission grant 120 to the user device 300. Therefore, the user device 300 is configured to use the allocated first set of contiguous frequency resources R1 and the corresponding first set of contiguous frequency resources R1' for transmitting data to the network node 300.

Figure 3:
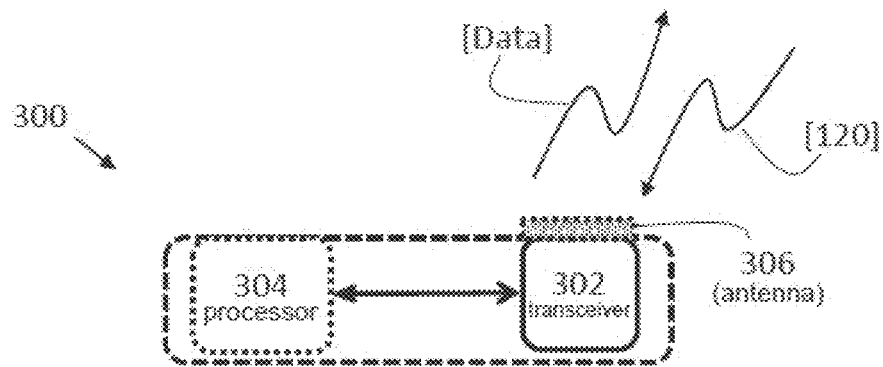
FIG. 3 shows a user device according to an embodiment of the disclosure.

FIG. 3 shows a user device 300 according to an embodiment of the disclosure. The user device 300 comprises a processor 304 communicably coupled to a transceiver 302. Further, an optional antenna 306 is shown in FIG. 3. The antenna 306 is coupled to the transceiver 302 and is configured to transmit and/or receive wireless communication signals in a wireless communication system 500.

Figure 4:
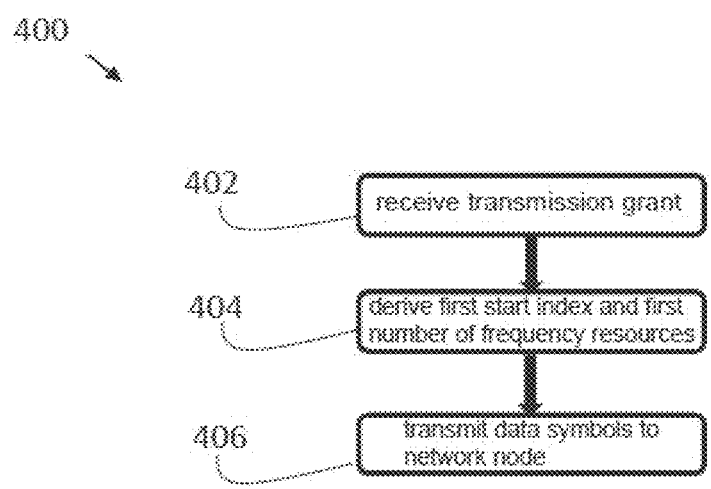
FIG. 4 shows a corresponding method according to an embodiment of the disclosure.

FIG. 4 shows a corresponding method which may be executed in a user device, such as the one described in FIG. 1. The method 400 comprises receiving 402 a transmission grant 120 comprising a resource indicator 110 from a network node 100. The resource indicator 110 comprises a first start index I1 and a first number of frequency resources N1. The first start index I1 and a first number of frequency resources N1 are used for allocating a first set of contiguous frequency resources R1 within a first sub-band, and further used for allocating a corresponding first set of contiguous frequency resources R1' within a second sub-band. The first sub-band and the second sub-band are non-overlapping and comprise equal number of frequency resources. The method 400 further comprises deriving 404 the first start index I1 and the first number of frequency resources N1 based on the resource indicator 110. The method 400 further comprises transmitting 406 data symbols to the network node 100 using the first set of contiguous frequency resources R1 and the corresponding first set of contiguous frequency resources R1'.

The user device 300, which may be any of a User Equipment (UE), mobile station (MS), wireless terminal or mobile terminal, is enabled to communicate wirelessly in a wireless communication system, sometimes also referred to as a cellular radio system. The UE may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM).

An idea of embodiments of the disclosure is that frequency resource allocation is based on a sub-band level, where the total transmission bandwidth of a wireless communication system is divided into several equal sub-bands in the frequency domain. In one embodiment, the frequency resource allocation is the same in all sub-bands of the transmission bandwidth. The network node 100 indicates the frequency resource allocation for the user device 300 within a sub-band. The user device 300 applies the same frequency resource allocation in each sub-band.

Figure 6:
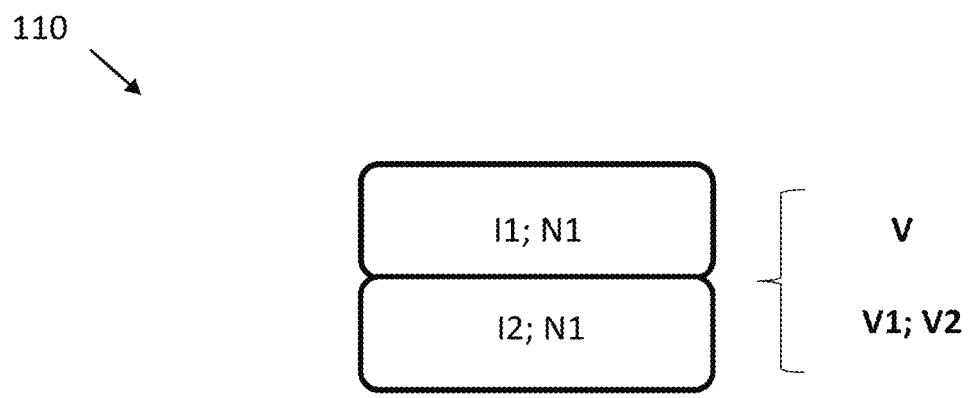
FIG. 6 illustrates different resource indicators.

FIG. 6 illustrates different embodiments of the resource indicator 110. The resource indicator 110 comprises a first start index I1 and a first number of frequency resources N1. The first start index I1 and a first number of frequency resources N1 may be represented as a single value V which is more explained below in relation to Table 1.

However, the resource indicator 110 comprises in an embodiment a second start index I2 and a second number of frequency resources N2 which are used for allocating a second set of contiguous frequency resources R2 within the first sub-band and a corresponding second set of contiguous frequency resources R2' within the second sub-band. According to this embodiment the first start index I1 and the first number of frequency resources N1 may be represented with a first value V1. The second start index I2 and the second number of frequency resources N2 may be represented with a second value V2.

The number of allocated resources may be explicitly indicated or implicitly indicated. In an embodiment the resource indicator 110 comprises a first end resource index associated with the first start resource index. Therefore, the first number of allocated resources N1 for the first set can be derived from the difference between the first end resource index and the first start resource index. This method is also applicable for indicating the second (and further) number of frequency resources N2.

In one particular case the first set of contiguous frequency resources R1 is allocated within a first sub-region of the first sub-band and within a corresponding first sub-region of the second sub-band, and the second set of contiguous frequency resources R2' is allocated within a second sub-region of the first sub-band and within a corresponding second sub-region of the second sub-band. The first sub-region and the second sub-region are non-overlapping and comprise equal number of frequency resources. This embodiment therefore assumes the division of each sub-bands into two or more sub-regions.

For a deeper understanding of embodiments of the disclosure different aspects of the disclosure are described in LTE system context. Therefore, LTE terminology and expressions are used, such as PUSCH, uplink grant, UE (corresponds to the present user device 300), etc. Embodiments of the disclosure are however not limited to such LTE systems which is well understood by the skilled person.

Figure 5:
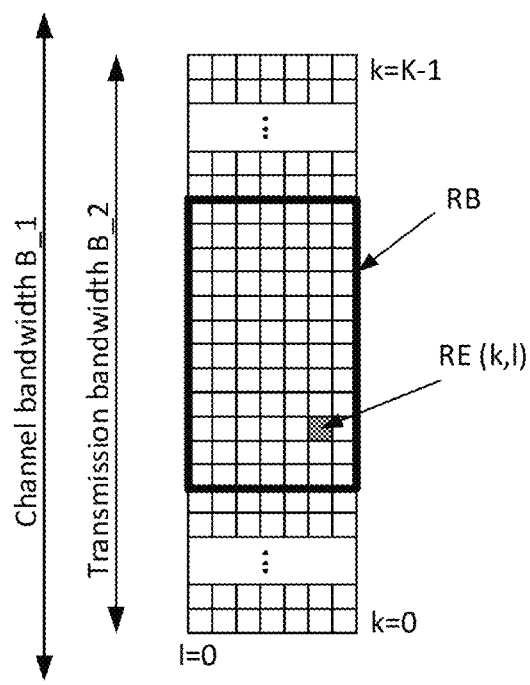
FIG. 5 illustrates time-frequency resources for multi-carrier waveform.

Consider a multi-carrier waveform where time-frequency resources are allocated for transmission of an uplink shared data channel. The allocation of time-frequency resources may be on subcarrier level, e.g., Resource Elements (REs), or groups of subcarriers, e.g., PRBs or Resource Block Groups (RBGs). One RBG may comprise several PRBs, and the detailed mapping between RBG and PRB is related to the transmission bandwidth as defined in 3GPP TS 36.213. FIG. 5 illustrates a general case with OFDM symbols, indexed from l=0, where a channel bandwidth (B_1) is defined for uplink transmission on a carrier and a transmission bandwidth (B_2) excludes the guard bands of the carrier and defines the maximum bandwidth (or maximum number of PRBs) which can be allocated for transmission. The time-frequency resources are defined by subcarriers, indexed from 0 to K−1.

In an exemplary embodiment the following properties holds:
  i. The total transmission bandwidth of the wireless communication system is divided into several equal sub-bands in the frequency domain;
  ii. In each sub-band there is one set of frequency resources allocated for PUSCH of a UE, where resource elements in each set are allocated in contiguous manner;
  iii. The resource allocation in each sub-band is the same;
  iv. The resource allocation is indicated by a single value representing the starting resource index and the number of allocated resources for the set within the sub-band.

Figure 7:
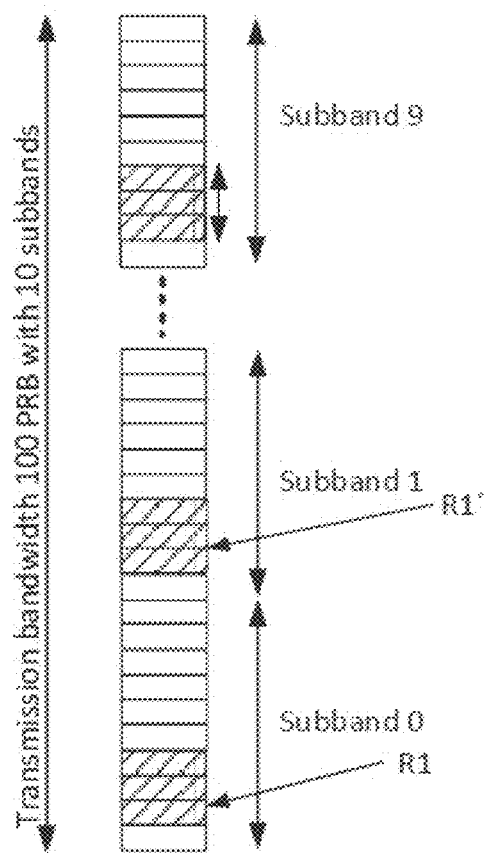
FIG. 7 illustrates an embodiment of the disclosure.

This embodiment is illustrated in FIG. 7 in which resource allocation for multi-cluster structure with 3 PRB single cluster in each sub-band, where a sub-band comprises 10 PRBs. FIG. 7 shows the allocation of the first cluster/set of frequency resources R1 and the corresponding first cluster/set of frequency resources R1' in all sub-bands of the transmission bandwidth.

This embodiment is advantageous because:
  The PUSCH resource allocation is indicated in a sub-band level instead of the entire bandwidth, which reduces the signalling overhead.
  Support of a variable number of PRB allocations which improves the scheduling flexibility.
  Support of frequency division multiplexing of UEs by assigning disjoint contiguous clusters to the UEs.
  The same resource allocation is made in every sub-band, which reduces the power dynamics of the PUSCH, e.g., the peak-to-average-power ratio (PAPR) or the cubic metric (CM).

One example of such indication using a single value is given in Table 1 below, for multi-set PUSCH with 10 PRBs per set for $N_{RB}^{UL}$=100 PRB transmission bandwidth consisting of 10 sub-bands each of 10 PRB. There is one set in each sub-band.

It should be noted from Table 1 that not all the values of N_PRB are supported, since they may not fulfil the condition of being a multiple of 2, 3 and 5 as described previously. Thus, in one embodiment of the disclosure, the corresponding signalling states of a Resource Indication Value (RIV) could be used to indicate other information or other values of N_PRB. For example, the value of 70 could be replaced by another valid value, e.g., 64, 72, or 75.

A skilled reader will further be able to apply the disclosed method in only a subset of the sub-bands. For example, for the case of 64 PRBs, 4 sub-bands could comprise 7 PRBs, while 6 sub-bands could comprise 6 PRBs. Resources could be indicated for 6 PRBs per sub-band as disclosed above and below, and it could be pre-determined which 4 sub-bands are allocated 7 PRBs and the position of the additional PRB in such a sub-band.

Therefore, under the condition that if the total number of allocated frequency resources of all sub-bands belongs to a predetermined set of values, the wireless communication system 500 comprises
  a plurality of non-overlapping sub-bands having the same frequency resource allocation; or
  at least one third sub-band having a frequency resource allocation different to the frequency resource allocation in the first sub-band or the second sub-band.

A resource allocation field in the resource indicator 110 comprises of a resource indication value (RIV) corresponding to a starting resource block ($RB_{START}$) index and a length in terms of contiguously allocated resource blocks ($L_{CRBs}$), within a sub-band. The indication can be expressed as:

if $(L_{CRBs}-1) \leq \lfloor N_{RB}^{Subband}/2 \rfloor$ then $RIV(RB_{START}, L_{CRBs}) = N_{RB}^{Subband}(L_{CRBs}-1) + RB_{START}$ else $RIV(RB_{START}, L_{CRBs}) = N_{RB}^{Subband}(N_{RB}^{Subband} - L_{CRBs} + 1) + (N_{RB}^{Subband} - 1 - RB_{START})$ where, in the given example, $N_{RB}^{Subband}$=10. The resource allocation in FIG. 7 is ($L_{CRBs}$=3, $RB_{START}$=1) within a sub-band corresponding to RIV=21. The RIV value could be represented, and signalled, in binary form, e.g., '010101'.

There is one to one mapping from allocated frequency resource within a sub-band and the number of PRBs indicated, i.e., N_PRB=10$L_{CRBs}$ as shown in Table 1. One alternative example is the number of PRBs and starting position within a sub-band are indicated. This can be also expressed as:

$f(RB_{START}, N\_PRB) = RIV(RB_{START}, N\_PRB/10)$

Table 1. The joint encoding in a sub-band for multi-cluster resource allocation with 10 PRBs per cluster for $N_{RB}^{UL}$=100 PRB transmission bandwidth consisting of 10 sub-band each of 10 PRBs.

| Resource indication value RIV | Number of PRBs N_PRB | Number of allocated frequency resources within a sub-band $L_{CRBs}$ (RB) | Starting position within a sub-band $RB_{START}$ (RB) |
| --- | --- | --- | --- |
| 0 | 10 | 1 | 0 |
| 1 | 10 | 1 | 1 |
| 2 | 10 | 1 | 2 |
| 3 | 10 | 1 | 3 |
| 4 | 10 | 1 | 4 |
| 5 | 10 | 1 | 5 |
| 6 | 10 | 1 | 6 |
| 7 | 10 | 1 | 7 |
| 8 | 10 | 1 | 8 |
| 9 | 10 | 1 | 9 |
| 10 | 20 | 2 | 0 |
| 11 | 20 | 2 | 1 |
| 12 | 20 | 2 | 2 |
| 13 | 20 | 2 | 3 |
| 14 | 20 | 2 | 4 |
| 15 | 20 | 2 | 5 |

-continued

| Resource indication value RIV | Number of PRBs N_PRB | Number of allocated frequency resources within a sub-band $L_{CRBs}$ (RB) | Starting position within a sub-band $RB_{START}$ (RB) |
|---|---|---|---|
| 16 | 20 | 2 | 6 |
| 17 | 20 | 2 | 7 |
| 18 | 20 | 2 | 8 |
| 20 | 30 | 2 | 0 |
| 21 | 30 | 3 | 1 |
| 22 | 30 | 3 | 2 |
| 23 | 30 | 3 | 3 |
| 24 | 30 | 3 | 4 |
| 25 | 30 | 3 | 5 |
| 26 | 30 | 3 | 6 |
| 27 | 30 | 3 | 7 |
| 30 | 40 | 4 | 0 |
| 31 | 40 | 4 | 1 |
| 32 | 40 | 4 | 2 |
| 33 | 40 | 4 | 3 |
| 34 | 40 | 4 | 4 |
| 35 | 40 | 4 | 5 |
| 36 | 40 | 4 | 6 |
| 40 | 50 | 5 | 0 |
| 41 | 50 | 5 | 1 |
| 42 | 50 | 5 | 2 |
| 43 | 50 | 5 | 3 |
| 44 | 50 | 5 | 4 |
| 45 | 50 | 5 | 5 |
| 50 | 60 | 6 | 0 |
| 51 | 60 | 6 | 1 |
| 52 | 60 | 6 | 2 |
| 53 | 60 | 6 | 3 |
| 54 | 60 | 6 | 4 |
| 49 | 70 | 7 | 0 |
| 48 | 70 | 7 | 1 |
| 47 | 70 | 7 | 2 |
| 46 | 70 | 7 | 3 |
| 39 | 80 | 8 | 0 |
| 38 | 80 | 8 | 1 |
| 37 | 80 | 8 | 2 |
| 29 | 90 | 9 | 0 |
| 28 | 90 | 9 | 1 |
| 19 | 100 | 10 | 0 |

The joint encoding of starting position and the number of PRBs within the sub-band is advantageous as the total signalling overhead is $\lceil \log_2 ((N_{RB}^{Subband}+1)N_{RB}^{Subband}/2) \rceil = 6$ bits, which is much less than 10 bits as needed in conventional methods, such as utilizing bitmaps. Reduction of the signalling overhead is beneficial as it improves the detection performance of the downlink control channel, which needs to be received correctly prior to transmitting the PUSCH.

In addition, the PUSCH resource allocation type 0, single cluster indication can be reused with the change of the indication is restricted in a sub-band, which reduces the specification and implementation effort.

Figure 8:
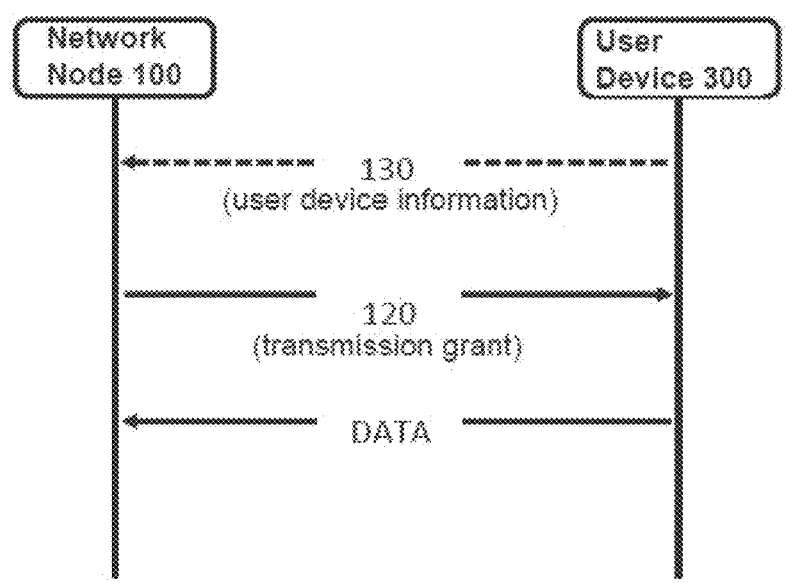
FIG. 8 illustrates signalling aspects of an embodiment of the disclosure.

A general signalling procedure between the network node 100 and the user device 300 is illustrated in FIG. 8 in a LTE system. The network node 100 transmits an uplink grant 120 comprising the present resource indicator 110 to the user device 300. Upon receiving the uplink grant 120 and therefore the resource indicator 110, the user device 300 derives the frequency allocation for UL transmissions and transmits data in the PUSCH to the network node 300. As understood by the skilled person the resource indicator 110 may at least comprise any of the information elements illustrated in FIG. 6.

Further, the embodiment in which the user device 300 transmits user device information 130 directly to the network node 100 is illustrated with the dashed arrow in FIG. 6. Upon receiving the user device information 130 the network node 100 based on the user device information 130 determines the resource indicator 110. Also further information may be considered by the network node 100 when determining the resource indicator 110, such as traffic information, mobility information, etc.

In another exemplary embodiment the following properties hold:
i. The total transmission bandwidth of the wireless communication system is divided into several equal sub-bands in the frequency domain;
ii. In each sub-band there are two different clusters allocated for PUSCH of a UE, where resource elements in each cluster are allocated in contiguous manner;
iii. The resource allocation in each sub-band is the same;
iv. The resource allocation is indicated by a single value representing a start index I1 and the number of allocated resources N1 for the first cluster (set 1) within a sub-band, and a start index I2 and a second number of allocated resources N2 for the second cluster (set 2) within a sub-band.

Figure 9:
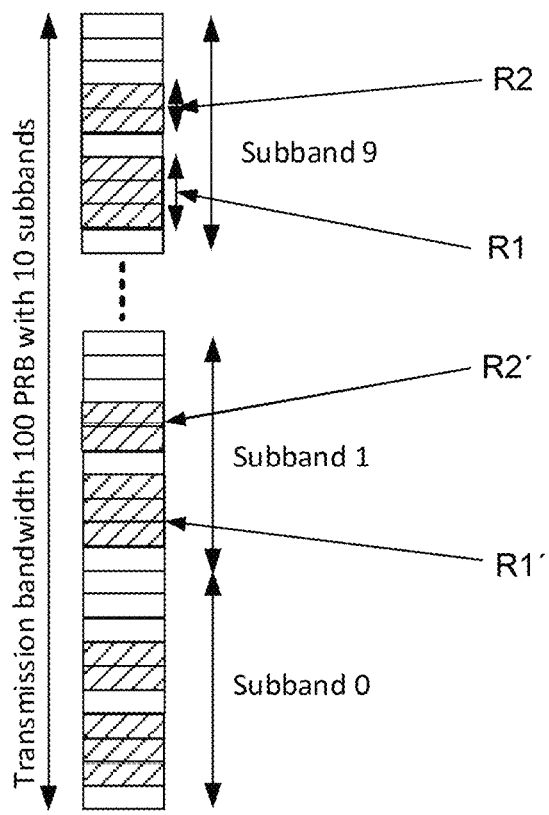
FIG. 9 illustrates a further embodiment of the disclosure.

This embodiment is illustrated in FIG. 9 in which resource allocation for multi-cluster structure with dual cluster in each sub-band, where a sub-band comprises 10 PRBs, set 1 comprises 3 PRBs and set 2 comprises 2 PRBs. FIG. 9 shows the allocation of the first set of frequency resources R1 and the corresponding first set of frequency resources R1'. Further, the allocation of the second set of frequency resources R2 and the corresponding second set of frequency resources R2 is shown in FIG. 9. This embodiment is advantageous since it can allow maximum transmit power from the user device 300. For example, considering the regulatory requirement on the power spectral density given per each 1 MHz, the resource allocation could provide two clusters in two different 1 MHz parts of the band. For example, suppose the sub-band has a bandwidth of 2 MHz, then a dual-cluster allocation could provide one cluster in each 1 MHz part of the sub-band.

One example is when the resource indicator 110, e.g., as a resource allocation field in the transmission grant 120, comprises of one resource indication value (RIV) where the resource indication corresponds to a starting and ending RB index of set 1, $s_0$ and $s_1-1$, and set 2, $s_2$ and $s_3-1$ respectively, where RIV is given by equation $$RIV = \sum_{i=0}^{U-1} \binom{V - s_i}{U - i}$$

with U=4, and $$\binom{x}{y} = \begin{cases} \binom{x}{y} & x \geq y \\ 0 & x < y \end{cases}$$

is the extended binomial coefficient, resulting in unique label $$RIV \in \left\{0, \Lambda, \binom{N}{M} - 1\right\}.$$

V is related to the sub-band bandwidth $N_{RB}^{Subband}$, and $V=N_{RB}^{Subband}+1$.

Therefore V=11 when sub-band bandwidth is 10 PRB for the case of the transmission bandwidth is 100 PRB and divided into 10 sub-bands. It shall be noted that in this way the number of resources allocated for a set is implicitly indicated. The number of resources allocated for set 1 is $s_1-s_0$ RBs.

One example of this embodiment is provided in FIG. 9. The resource allocation in FIG. 9 is ($s_0=1$, $s_1=4$) corresponding to set 1 in a sub-band, ($s_2=5$, $s_3=7$) corresponding to set 2 in a sub-band. Therefore, the resource indication $$RIV = \sum_{i=0}^{3} \binom{V-s_i}{4-i} = 264$$

could be represented, and signalled, in binary form '100001000'. It is further realized that the total number of allocated PRBs, N_PRB, can be determined from the values of RIV (or equivalently $s_0$, $s_1$, $s_2$ and $S_3$) and the number of sub-bands.

This form of encoding is advantageous as the total signalling overhead is $\lceil \log_2(V(V-1)(V-2)(V-3)/(4*3*2*1)) \rceil = 9$ bits, which is less than 10 bits as needed in conventional methods, e.g., utilizing bitmaps. In addition, the PUSCH resource allocation type 2, dual set indication can be reused with the change of the indication is restricted in a sub-band, which reduces the specification and implementation effort.

In yet another exemplary embodiment the following properties holds:
  i. The total transmission bandwidth of the wireless communication system is divided into several equal sub-bands in the frequency domain;
  ii. Each sub-band is further divided into two sub-regions in the frequency domain;
  iii. In each sub-region there is at most one cluster allocated for PUSCH of a UE, where resource elements in each cluster are allocated in contiguous manner;
  iv. The resource allocation in each sub-band is the same;
  v. The resource allocation is indicated by two values, where a first value V1 represents the starting resource index and the number of allocated resources for the cluster (set) within the first sub-region of a sub-band, and a second value V2 represents resource index and the number of allocated resources for the cluster (set) within the second sub-region of a sub-band.

Therefore, the resource indicator 110 according to this embodiment further comprises a second start index I2 and a second number of frequency resources N2 used for allocating a second set of contiguous frequency resources R2 within the first sub-band, and a corresponding second set of contiguous frequency resources R2' within the second sub-band. Further, the first set of contiguous frequency resources R1 is allocated within a first sub-region of the first sub-band and within a corresponding first sub-region of the second sub-band. The second set of contiguous frequency resources R2' is allocated within a second sub-region of the first sub-band and within a corresponding second sub-region of the second sub-band. The first sub-region and the second sub-region are non-overlapping and comprise equal number of frequency resources.

Figure 10:
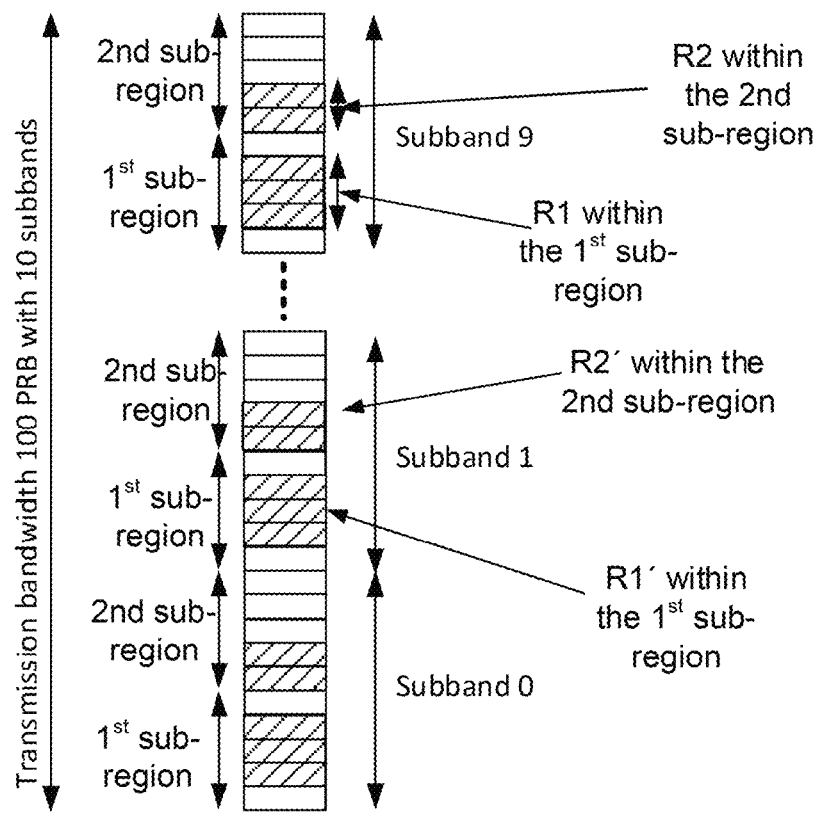
FIG. 10 illustrates a further embodiment of the disclosure.

This embodiment is illustrated in FIG. 10 in which resource allocation for multi-cluster structure with dual cluster in each sub-band and single cluster in each sub-region. A sub-band comprises 10 PRBs and each sub-band is divided into 2 equally sized sub-regions, each corresponding to 5 PRBs. FIG. 10 shows the allocation of the first set of frequency resources R1 and the corresponding first set of frequency resources R1' in the first sub-region. Further, the allocation of the second set of frequency resources R2 and the corresponding second set of frequency resources R2 in the second sub-region is shown in FIG. 9.

This embodiment is advantageous as there is flexibility within each sub-band that a dual-cluster PUSCH resource allocation is allowed, supporting more flexible resource allocation and UE multiplexing. It shall be noted that the PUSCH resource allocation is the same in each sub-band.

One example of the indication is given in Table 2, for multi-cluster PUSCH with 10 PRBs per set for $N_{RB}^{UL}=100$ PRB transmission bandwidth consisting of 10 sub-bands each of 10 PRB. Each sub-band is further divided into two sub-regions, where there is one cluster in each sub-region. It should be noted from Table 2 that not all the PRB values may be supported.

A resource allocation field in the UL grant 110 comprises of two resource indication values (RIV) where one value represents the starting resource index and the number of allocated resources for the cluster within the first sub-region of a sub-band, and the other value represents resource index and the number of allocated resources for the cluster within the second sub-region of a sub-band. There are in total $2*\lceil \log_2((N_{RB}^{SubRegion}+1)N_{RB}^{SubRegion}/2) \rceil = 8$ bits used for two resource indication values, where the first 4 bits are for one sub-region, and the second 4 bits are for the other sub-region. The indication for one sub-region can be expressed as:

if $(L_{CRBs}-1) \leq \lfloor N_{RB}^{Subband}/2 \rfloor$ then $RIV(RB_{START}, L_{CRBs}) = N_{RB}^{SubRegion}(L_{CRBs}-1)+RB_{START}$ else $RIV(RB_{START}, L_{CRBs}) = N_{RB}^{SubRegion}(N_{RB}^{SubRegion} - L_{CRBs}+1)+(N_{RB}^{Subband}-1-RB_{START})$ where in the given example, $N_{RB}^{SubRegion}=5$.

The resource allocation in FIG. 10 is ($L_{CRBs}=3$, $RB_{START}=1$) corresponding to RIV=11 for the first sub-region, ($L_{CRBs}=2$, $RB_{START}=0$) corresponding to RIV=5 for the second sub-region. Therefore, the resource indication could be represented, and signalled, in binary form '10110101'. It is further realized that the total number of allocated PRBs, N_PRB, can be determined from the values of $L_{cRBs}$ and the number of sub-bands.

The joint encoding of the allocation of two clusters within the sub-band is advantageous as the total signalling overhead is 8 bits, which is less than 10 bits as needed in conventional methods, e.g., utilizing bitmaps. In addition, the PUSCH resource allocation type 0, single cluster indication can be reused with the change of two single cluster indications needed, where each indication is restricted in a sub-region (half a sub-band), which reduces the specification and implementation effort.

One state, e.g., the state with all ones, i.e., '1111', could correspond to that no PUSCH is allocated in this sub-region. By allocating no PUSCH in the first sub-region while allocating PUSCH in the other sub-region, it provides a fall back to a single cluster PUSCH within a sub-band. It is advantageous as a fall back to single cluster PUSCH within each sub-band is supported which provides reduced CM performance.

Table 2. The joint encoding in a sub-region for multi-cluster resource allocation with 10 PRBs per cluster for $N_{RB}^{UL}$=10(PRB transmission bandwidth consisting of 10 sub-band each of 10 PRBs, where each sub-band consists of two sub-regions.

| Resource indication value RIV | Number of frequency resources within a sub-region $L_{CRBs}$ (RB) | Starting position within a sub-band $RB_{START}$ (RB) |
|---|---|---|
| 0 | 1 | 0 |
| 1 | 1 | 1 |
| 2 | 1 | 2 |
| 3 | 1 | 3 |
| 4 | 1 | 4 |
| 5 | 2 | 0 |
| 6 | 2 | 1 |
| 7 | 2 | 2 |
| 8 | 2 | 3 |
| 10 | 3 | 0 |
| 11 | 3 | 1 |
| 12 | 3 | 2 |
| 14 | 4 | 0 |
| 13 | 4 | 1 |
| 9 | 5 | 0 |
| 15 | 0 | Not Applicable |

Figure 11:
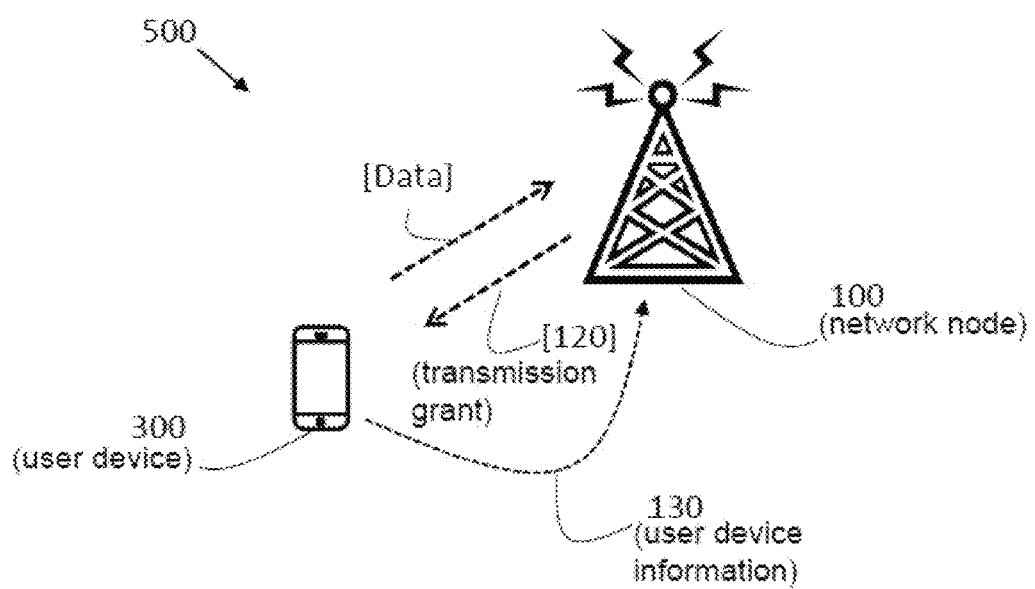
FIG. 11 illustrates a wireless communication system according to an embodiment of the disclosure.

FIG. 11 shows a wireless communication system 500 comprising at least one network node 100 and at least one user device 300 according to an embodiment of the present disclosure. The user device 300 receives a transmission grant 120 comprising a resource indicator 110 from the network node 100. After deriving the frequency allocation(s) in the resource indicator 110 the user device 300 transmits data to the network node 100 in the allocated frequency resources.

Furthermore, any methods according to embodiments of the disclosure may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the network node 100 and user device 300 comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present network node 100 and user device 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the disclosure is not limited to the embodiments described above, but also relates to and incorporates all embodiments within the scope of the appended independent claims.

The invention claimed is:

1. A network node for a wireless communication system, the network node comprising:
    a processor configured to determine a resource indicator, the resource indicator comprising a single resource allocation value that specifies a first start index and a first number of frequency resources; and
    a transceiver configured to transmit a transmission grant comprising the resource indicator to a user device,
    wherein the first start index and the first number of frequency resources are configured to be used for allocating a first set of contiguous frequency resources within a first sub-band and a corresponding first set of contiguous frequency resources within a second sub-band, and
    wherein the first sub-band and the second sub-band are non-overlapping.

2. The network node according to claim 1, wherein the allocation of the first set of contiguous frequency resources within the first sub-band is identical to the allocation of the corresponding first set of contiguous frequency resources within the second sub-band.

3. The network node according to claim 1, wherein the transceiver is further configured to receive user device information comprising at least one element selected from a group of: a reference signal associated with the user device, a total number of bits in a transmission buffer of the user device, and an available transmission power at the user device, and
    wherein the processor is further configured to determine the resource indicator based on the received user device information.

4. The network node according to claim 1, wherein a total number of allocated frequency resources of all sub-bands belongs to a predetermined set of values, and
    wherein the wireless communication system comprises one or more of:
    a plurality of non-overlapping sub-bands having a same frequency resource allocation, and
    at least one third sub-band having a frequency resource allocation different than the frequency resource allocation in the first sub-band or the second sub-band.

5. The network node according to claim 1, wherein the resource indicator further specifies a second start index and a second number of frequency resources, and
    wherein the second start index and the second number of frequency resources are configured to be used for allocating a second set of contiguous frequency resources within the first sub-band and a corresponding second set of contiguous frequency resources within the second sub-band.

6. The network node according to claim 5, wherein the first set of contiguous frequency resources is allocated within a first sub-region of the first sub-band and wherein the corresponding first set of contiguous frequency resources is allocated within a corresponding first sub-region of the second sub-band, wherein the second set of contiguous frequency resources is allocated within a second sub-region of the first sub-band and wherein the corresponding second set of contiguous frequency resources is allocated within a corresponding second sub-region of the second sub-band, and wherein the first sub-region and the second sub-region are non-overlapping and comprise an equal number of frequency resources.

7. The network node according to claim 6, wherein the resource indicator comprises a first allocation value and a second allocation value, wherein the first allocation value is the single resource allocation value that specifies the first start index and the first number of frequency resources or an allocation value that specifies an empty set of frequency resources within the first sub-region and the corresponding first sub-region, and wherein the second allocation value specifies the second start index and the second number of frequency resources or an empty set of frequency resources within the second sub- region and the corresponding second sub-region.

8. The network node according to claim 1, wherein the allocation of the first set of contiguous frequency resources within the first sub-band comprises a number and a position of the frequency resources within the first sub-band, and wherein the allocation of the corresponding first set of contiguous frequency resources within the second sub-band comprises a number and a position of the frequency resources within the second sub-band.

9. A user device for a wireless communication system, the user device comprising:

a transceiver configured to:
receive, from a network node, a transmission grant comprising a resource indicator, the resource indicator comprising a single allocation value that specifies a first start index and a first number of frequency resources, and
transmit data symbols to the network node using a first set of contiguous frequency resources within a first sub-band and a corresponding first set of contiguous frequency resources within a second sub-band; and a processor configured to derive, based on the resource indicator, the first start index and the first number of frequency resources, wherein the first start index and the first number of frequency resources are configured to be used for allocating the first set of contiguous frequency resources within the first sub-band and the corresponding first set of contiguous frequency resources within the second sub-band, and wherein the first sub-band and the second sub-band are non-overlapping.

10. The user device according to claim 9, wherein the allocation of the first set of contiguous frequency resources within the first sub-band is identical to the allocation of the corresponding first set of contiguous frequency resources within the second sub-band.

11. The user device according to claim 9, wherein the resource indicator further specifies a second start index and a second number of frequency resources, wherein the second start index and the second number of frequency resources are configured to be used for allocating a second set of contiguous frequency resources within the first sub-band and a corresponding second set of contiguous frequency resources within the second sub-band, wherein the processor is further configured to derive the second start index and the second number of frequency resources based on the resource indicator, and wherein the transceiver is further configured to transmit data symbols to the network node using the second set of contiguous frequency resources within the first sub-band and the corresponding second set of contiguous frequency resources within the second sub-band.

12. The user device according to claim 11, wherein the first set of contiguous frequency resources is allocated within a first sub-region of the first sub- band and the corresponding first set of contiguous frequency resources is allocated within a corresponding first sub-region of the second sub-band, wherein the second set of contiguous frequency resources is allocated within a second sub-region of the first sub-band and the corresponding second set of contiguous frequency resources is allocated within a corresponding second sub-region of the second sub-band, and wherein the first sub-region and the second sub-region are non-overlapping and comprise an equal number of frequency resources.

13. The user device according to claim 12, wherein the resource indicator has a first allocation value and a second allocation value, wherein the first allocation value is the single resource allocation value that specifies the first start index and the first number of frequency resources or an allocation value that specifies empty set of frequency resources within the first sub-region and the corresponding first sub-region, wherein the second allocation value specifies the second start index and the second number of frequency resources or an empty set of frequency resources within the second sub- region and the corresponding second sub-region, and wherein the processor is further configured to:
derive the first start index and the first number of frequency resources based on the first allocation value, and
derive the second start index and the second number of frequency resources based on the second allocation value, and wherein the transceiver is further configured to:
transmit data symbols to the network node using the first set of contiguous frequency resources and the corresponding first set of contiguous frequency resources, and
transmit data symbols to the network node using the second set of contiguous frequency resources and the corresponding second set of contiguous frequency resources.

14. The user device according to claim 11, wherein the processor is configured to derive, based on the single resource allocation value, at least one of the following:
the first start index and the first number of frequency resources; and
the second start index and the second number of frequency resources.

15. The user device according to claim 9, wherein the allocation of the first set of contiguous frequency resources within the first sub-band comprises a number and a position of the frequency resources within the first sub-band, and wherein the allocation of the corresponding first set of contiguous frequency resources within the second sub-band comprises a number and a position of the frequency resources within the second sub-band.

16. A method, comprising:
determining a resource indicator comprising a single allocation value that specifies a first start index and a first number of frequency resources; and
transmitting a transmission grant comprising the resource indicator to a user device,
wherein the first start index and the first number of frequency resources are used for allocating a first set of contiguous frequency resources within a first sub-band and a corresponding first set of contiguous frequency resources within a second sub-band, and
   wherein the first sub-band and the second sub-band are non-overlapping.

17. The method according to claim 16, wherein the allocation of the first set of contiguous frequency resources within the first sub-band is identical to the allocation of the corresponding first set of contiguous frequency resources within the second sub-band.

18. The method according to claim 16, wherein the allocation of the first set of contiguous frequency resources within the first sub-band comprises a number and a position of the frequency resources within the first sub-band, and
wherein the allocation of the corresponding first set of contiguous frequency resources within the second sub-band comprises a number and a position of the frequency resources within the second sub-band.

19. A method, comprising:
receiving, from a network node, a transmission grant comprising a resource indicator, the resource indicator comprising a single allocation value that specifies a first start index and a first number of frequency resources;
deriving the first start index and the first number of frequency resources based on the resource indicator; and
transmitting data symbols to the network node using a first set of contiguous frequency resources within a first sub-band and a corresponding first set of contiguous frequency resources within a second sub-band,
wherein the first start index and the first number of frequency resources are used for allocating the first set of contiguous frequency resources within the first sub-band and the corresponding first set of contiguous frequency resources within the second sub-band, and
wherein the first sub-band and the second sub-band are non-overlapping.

20. The method according to claim 19, wherein the allocation of the first set of contiguous frequency resources within the first sub-band is identical to the allocation of the corresponding first set of contiguous frequency resources within the second sub-band.

21. The method according to claim 19, wherein the allocation of the first set of contiguous frequency resources within the first sub-band comprises a number and a position of the frequency resources within the first sub-band, and
wherein the allocation of the corresponding second set of contiguous frequency resources within the second sub-band comprises a number and a position of the frequency resources within the second sub-band.

22. A non-transitory computer readable medium storing computer executable code that, when executed by a processor, causes the processor to perform the method according to claim 16.

23. A non-transitory computer readable medium storing computer executable code that, when executed by a processor, causes the processor to perform the method according to claim 19.

* * * * *